(12) United States Patent
Liao

(10) Patent No.: US 10,023,262 B2
(45) Date of Patent: Jul. 17, 2018

(54) DIRECT-DRIVE DOUBLE WING SCOOTER

(71) Applicant: HSIN LUNG ACCESSORIES CO., LTD., Hsin-Chu Hsien (TW)

(72) Inventor: Hsueh-Sen Liao, Hsin-Chu Hsien (TW)

(73) Assignee: HSIN LUNG ACCESSORIES CO., LTD., Hsin-Chu Hsien (TW)

( * ) Notice: Subject to any disclaimer, the term of this patent is extended or adjusted under 35 U.S.C. 154(b) by 0 days.

(21) Appl. No.: 15/674,631

(22) Filed: Aug. 11, 2017

(65) Prior Publication Data

US 2017/0341703 A1 Nov. 30, 2017

Related U.S. Application Data

(63) Continuation-in-part of application No. 15/144,035, filed on May 2, 2016.

(51) Int. Cl.
*B62M 1/26* (2013.01)
*B62K 3/00* (2006.01)
*B62M 1/28* (2013.01)
*F16H 37/12* (2006.01)
*B62K 21/12* (2006.01)
*B62K 23/06* (2006.01)

(52) U.S. Cl.
CPC .............. *B62M 1/26* (2013.01); *B62K 3/002* (2013.01); *B62M 1/28* (2013.01); *F16H 37/122* (2013.01); *B62K 21/12* (2013.01); *B62K 23/06* (2013.01)

(58) Field of Classification Search
CPC ................................ B62M 1/26; B62K 3/002
See application file for complete search history.

(56) References Cited

U.S. PATENT DOCUMENTS

| 6,659,486 | B2 * | 12/2003 | Eschenbach | B62K 3/002 |
| | | | | 280/221 |
| 7,784,808 | B2 * | 8/2010 | Fan | B62M 1/26 |
| | | | | 280/221 |
| 7,988,169 | B2 * | 8/2011 | Baek | B62K 3/002 |
| | | | | 280/221 |
| 7,988,170 | B1 * | 8/2011 | Fan | B62M 1/28 |
| | | | | 280/220 |
| 8,056,915 | B2 * | 11/2011 | Pang | B62M 1/26 |
| | | | | 280/210 |

(Continued)

FOREIGN PATENT DOCUMENTS

CN 203854811 U * 10/2014

*Primary Examiner* — Kevin Hurley
(74) *Attorney, Agent, or Firm* — Jackson IPG PLLC; Demian K. Jackson

(57) ABSTRACT

A direct-drive double wing scooter includes a frame, an actuation assembly, a drive assembly, and a transmission assembly. The actuation assembly includes left and right swing wings each pivoted close to a front end of the frame through a pivot. The drive assembly includes a first turning shaft and a second turning shaft penetrating two sides of the frame. A distance between the first turning shaft and the pivot is defined as a first distance. A distance between a rear end of the right swing wing is defined as a second distance, or a distance between a rear end of the left swing wing is defined as a second distance. The first distance is in the range of 0.10-0.65 times the length of the second distance. The direct-drive double wing scooter provides a simple and reliable drive way and has transportation, amusement and fitness effects.

16 Claims, 7 Drawing Sheets

(56) References Cited

U.S. PATENT DOCUMENTS

| | | | | |
|---|---|---|---|---|
| 8,128,111 B2 * | 3/2012 | Scolari | ............ | B62M 1/26 |
| | | | | 280/221 |
| 9,051,017 B2 * | 6/2015 | Scolari | ............ | B62K 19/18 |
| 9,114,848 B2 * | 8/2015 | Scolari | ............ | B62K 3/002 |
| 9,334,015 B2 * | 5/2016 | Scolari | ............ | B62M 9/12 |
| 2002/0093171 A1 * | 7/2002 | Chen | ............ | B62K 3/002 |
| | | | | 280/253 |
| 2004/0018919 A1 * | 1/2004 | Chen | ............ | A63B 22/0056 |
| | | | | 482/57 |
| 2014/0225346 A1 * | 8/2014 | Bettin | ............ | B62K 15/008 |
| | | | | 280/236 |
| 2015/0217832 A1 * | 8/2015 | Kataoka | ............ | B62M 1/28 |
| | | | | 280/228 |

* cited by examiner

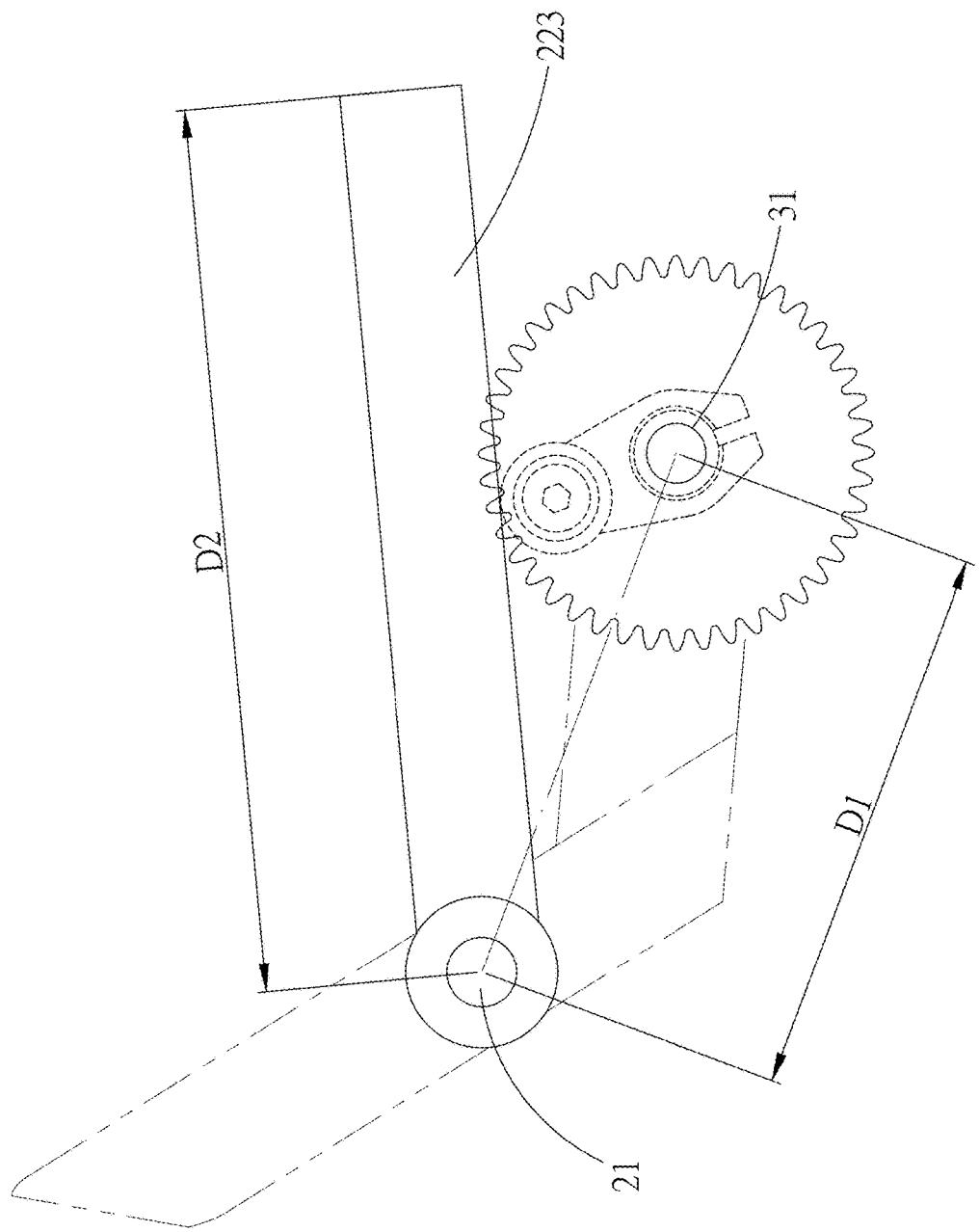

DIRECT-DRIVE DOUBLE WING SCOOTER

BACKGROUND OF THE INVENTION

1. Field of the Invention

The present invention relates to a direct-drive double wing scooter, and more particularly to a direct-drive double wing scooter which provides a simple and reliable drive way different from that of a traditional bike and has transportation, amusement and fitness effects.

2. Description of the Prior Art

In general, the way for a bike to go forward is that the rider treads on a pair of pedals having an included angle of 180 degrees in a continuous circular motion and then wheels are driven through the associated drive components (such as, a large gear, a chain, a sprocket wheel . . . etc.). The wheels driven by the continuous rotation roll on the ground, so that the bike can go forward.

A conventional bike is provided with a seat for the rider to sit thereon. The rider is supported by the seat, such that the rider can tread on the pedals smoothly and safely for performing the continuous circular motion. The rider's body can be supported by the seat to provide a riding comfort for a long time, but the motility of the upper part of the body is reduced. The expected effect of sport and fitness is not good, and the fun and amusement of riding is decreased. As a result, the bike won't be used often in the future. Accordingly, the inventor of the present invention has devoted himself based on his many years of practical experiences to solve these problems and to develop a direct-drive double wing scooter which has a simple and reliable structure and provides a drive way different from that of a traditional bike and has transportation, amusement and fitness effects.

SUMMARY OF THE INVENTION

The primary object of the present invention is to provide a direct-drive double wing scooter which provides a simple and reliable drive way different from that of a traditional bike. The direct-drive double wing scooter has transportation, amusement and fitness effects.

In order to achieve the aforesaid object, the direct-drive double wing scooter of the present invention comprises a frame, an actuation assembly, a drive assembly, and a transmission assembly. A front end of the frame is provided with a handle unit and a front wheel disposed under the handle unit and controlled by the handle unit. A rear end of the frame is provided with a rear wheel. The actuation assembly comprises two swing wings each pivoted to the front end of the frame through a pivot. The two swing wings are a right swing wing located at a right side of the frame and a left swing wing located at a left side of the frame. The drive assembly comprises a first turning shaft and a second turning shaft. The first turning shaft and the second turning shaft penetrate through the left and right sides of the frame. One end of the first turning shaft is provided with a first gear. One end of the second turning shaft is provided with a second gear meshing with the first gear. The first gear and the second gear are located at the same side of the frame. Two ends of the first turning shaft are provided with a pair of cranks having an included angle of 180 degrees. A tail end of each crank is pivotally connected with a third turning shaft to lean against a corresponding one of the right swing wing and the left swing wing. The transmission assembly comprises a one-way sprocket wheel located at another end of the second turning shaft opposite the second gear, a third gear disposed at a wheel axle of the rear wheel, and a chain fitted around the one-way sprocket wheel and the third gear. A distance between the first turning shaft and the pivot is defined as a first distance. A distance between a rear end of the right swing wing and the pivot is defined as a second distance, or a distance between a rear end of the left swing wing and the pivot is defined as a second distance. The first distance is in the range of 0.10-0.65 times the length of the second distance. The two third turning shafts of the pair of cranks are a right third turning shaft in contact with the right swing wing and a left third turning shaft in contact with the left swing wing. When a connecting line between the right third turning shaft and the first turning shaft is perpendicular to the right swing wing, the right swing wing and the left swing wing form an upper dead point included angle. When a connecting line between the left third turning shaft and the first turning shaft is perpendicular to the left swing wing, the right swing wing and the left swing wing form a lower dead point included angle. The lower dead point included angle is greater than the upper dead point included angle. A difference between the lower dead point included angle and the upper dead point included angle is in the range of 0.05-3.80 degrees, or a ratio of the upper dead point included angle to the lower dead point included angle is in the range of 0.85-1.00.

According to the aforesaid technical features, the difference between the lower dead point included angle and the upper dead point included angle is in the range of 0.05-3.80 degrees, and the ratio of the upper dead point included angle to the lower dead point included angle is in the range of 0.85-1.00.

According to the aforesaid technical features, the first distance is in the range of 0.18-0.65 times the length of the second distance.

According to the aforesaid technical features, the ratio of the upper dead point included angle to the lower dead point included angle is in the range of 0.90-1.00.

According to the aforesaid technical features, the upper dead point included angle is in the range of 10.46-36.20 degrees.

According to the aforesaid technical features, the lower dead point included angle is in the range of 10.51-40.00 degrees.

According to the aforesaid technical features, a vertical distance between the pivot and the ground is greater than or equal to a vertical distance between the first turning shaft and the ground.

According to the aforesaid technical features, a vertical distance between the pivot and the ground is equal to a vertical distance between the first turning shaft and the ground.

The direct-drive double wing scooter of the present invention provides a simple and reliable drive way and provides a drive mode different from that of a traditional bike and has transportation, amusement and fitness effect.

Due to the design of the difference between the lower dead point included angle and the upper dead point included angle, the right swing wing and the left swing wing are complementary to each other so that they won't be jammed.

BRIEF DESCRIPTION OF THE DRAWINGS

FIG. 5 is a schematic view showing the first distance and the second distance of the direct-drive double wing scooter in accordance with the preferred embodiment of the present invention;

DETAILED DESCRIPTION OF THE PREFERRED EMBODIMENTS

Embodiments of the present invention will now be described, by way of example only, with reference to the accompanying drawings.

Figure 1:
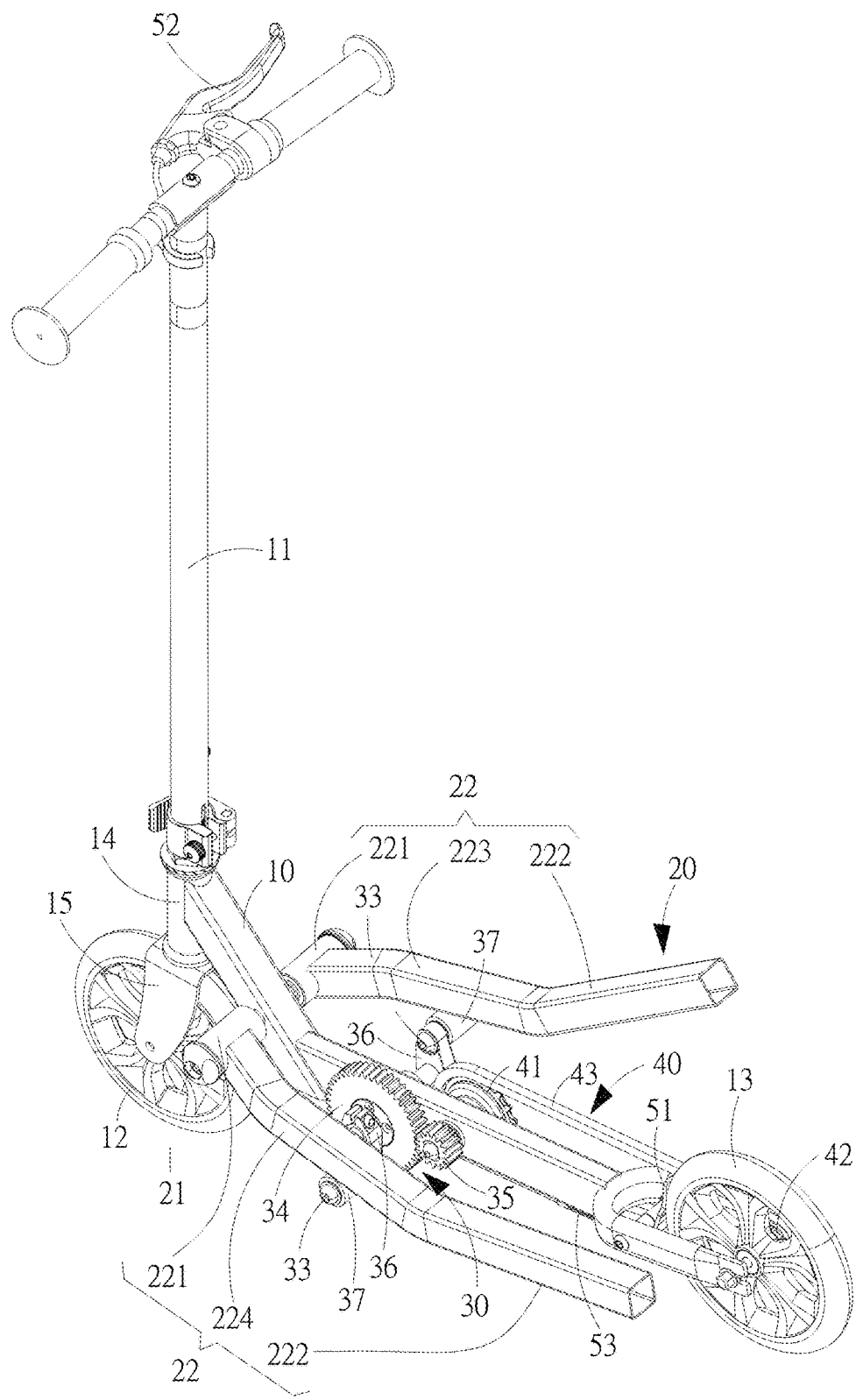
FIG. 1 is a perspective view of a direct-drive double wing scooter in accordance with a preferred embodiment of the present invention.
Figure 2:
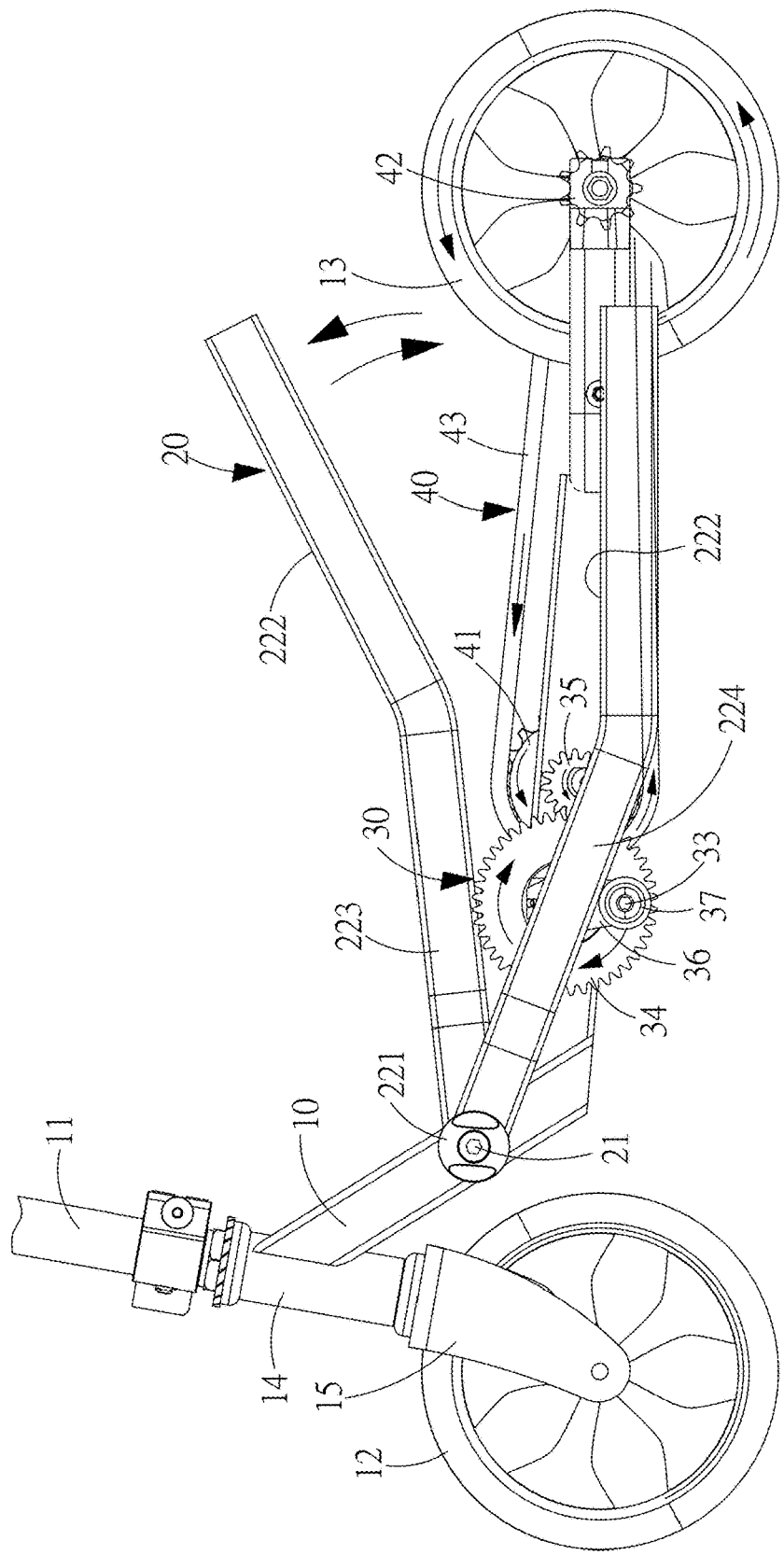
FIG. 2 is a side view of the direct-drive double wing scooter in accordance with the preferred embodiment of the present invention.
Figure 3:
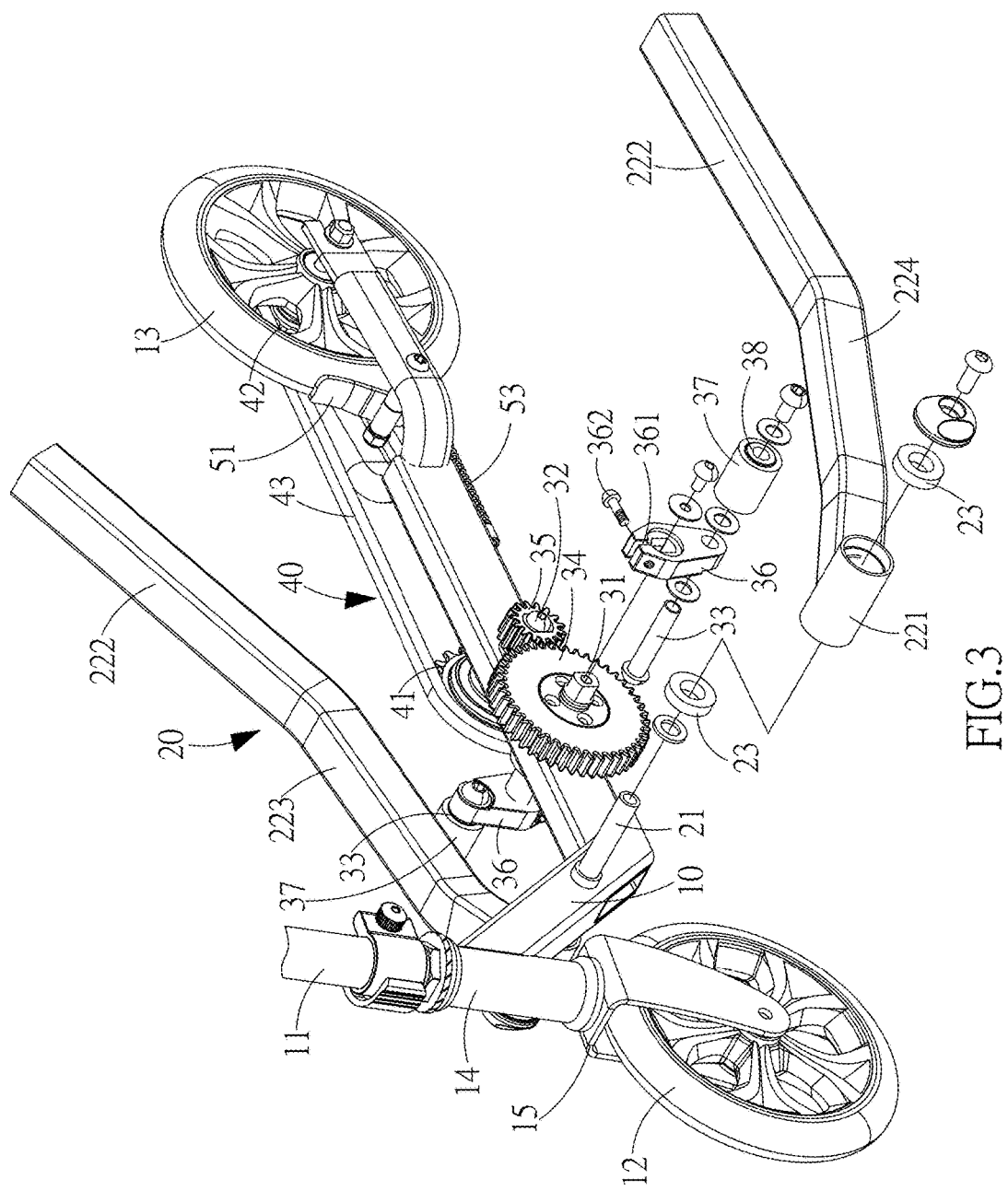
FIG. 3 is a schematic view showing a drive assembly in accordance with the preferred embodiment of the present invention.

The present invention discloses a direct-drive double wing scooter which provides a simple and reliable drive way different from that of a traditional bike. The direct-drive double wing scooter has transportation, amusement and fitness effects. FIG. 1 is a perspective view of a direct-drive double wing scooter in accordance with a preferred embodiment of the present invention. FIG. 2 is a side view of the direct-drive double wing scooter in accordance with the preferred embodiment of the present invention. FIG. 3 is a schematic view showing a drive assembly in accordance with the preferred embodiment of the present invention. The direct-drive double wing scooter of the present invention comprises a frame 10, an actuation assembly 20, a drive assembly 30, and a transmission assembly 40. A front end of the frame 10 is provided with a handle unit 11 and a front wheel 12 disposed under the handle unit 11 and controlled by the handle unit 11. A rear end of the frame 10 is provided with a rear wheel 13. In practice, the front end of the frame 10 is further provided with a front outer pipe 14 and a front fork 15 inserted in the front outer pipe 14. The front wheel 12 is pivotally connected to a lower end of the front fork 15. The handle unit 11 is connected with an upper end of the front fork 15.

The actuation assembly 20 comprises two swing wings 22 which are pivoted close to the front end of the frame 10 through a pivot 21. A front end of each swing wing 22 is provided with a sleeve 221 for insertion of the pivot 21. The sleeve 221 of each swing wing 22 is provided with at least one bearing 23 therein. The bearing 23 is located between the pivot 21 and the sleeve 221. A rear end of each swing wing 22 is formed with a step section 222 which is inclined upward at a predetermined angle. The step section 222 may be further provided with a pedal. The two swing wings 22 further define a right swing wing 223 located at a right side of the frame 10 and a left swing wing 224 located at a left side of the frame 10. The right swing wing 223 includes the corresponding step section 222. The left swing wing 224 includes the corresponding step section 222.

The drive assembly 30 is disposed at a position where the swing route of the two swing wings 22 relative to the frame 10 is located. The drive assembly 30 comprises a first turning shaft 31 and a second turning shaft 32. The first turning shaft 31 and the second turning shaft 32 penetrate through the left and right sides of the frame 10. One end of the first turning shaft 31 is provided with a first gear 34, and one end of the second turning shaft 32 is provided with a second gear 35 meshing with the first gear 34. The first gear 34 and the second gear 35 are located at the same side of the frame 10. Two ends of the first turning shaft 31 are provided with a pair of cranks 36 having an included angle of 180 degrees. A tail end of each crank 36 is pivotally connected with a third turning shaft 33 to lean against a corresponding one of the right swing wing 223 and the left swing wing 224 and a drive member 37 fitted on the turning shaft 33. In practice, the number of gear teeth of the first gear 34 is greater than the number of gear teeth of the second gear 35.

The transmission assembly 40 comprises a one-way sprocket wheel 41 located at another end of the second turning shaft 32 opposite the second gear 35, a third gear 42 disposed at a wheel axle of the rear wheel 13, and a chain 43 fitted around the one-way sprocket wheel 41 and the third gear 42.

Figure 4:
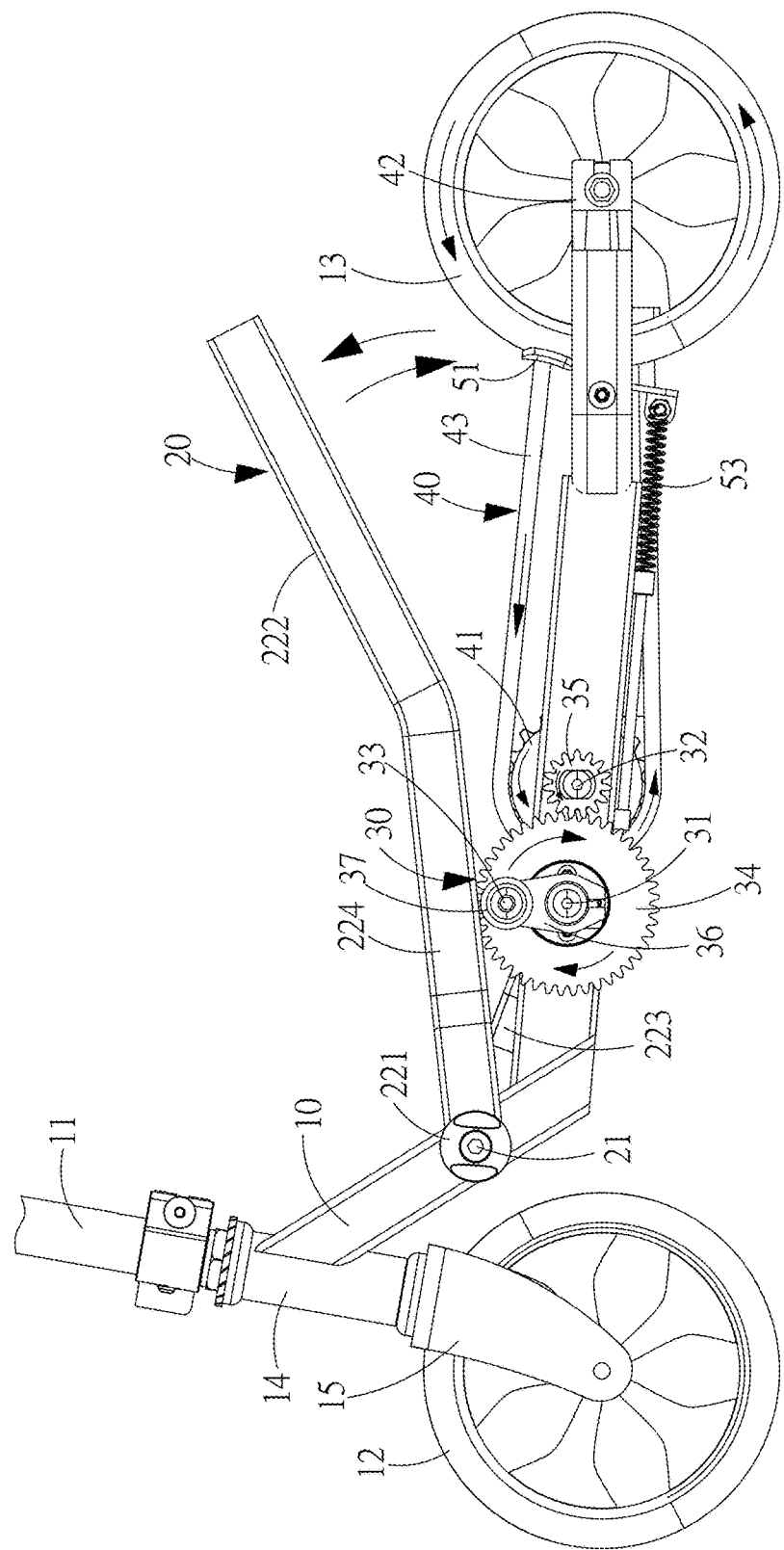
FIG. 4 is a schematic view showing the operation of the direct-drive double wing scooter in accordance with the preferred embodiment of the present invention.

When the direct-drive double wing scooter of the present invention is used, the rider grips the handle of the handle unit with both hands and treads on the right swing wing 223 and the left swing wing 224 by turns with both feet. The right swing wing 223 and the left swing wing 224 are swung up and down by the feet (as shown in FIG. 2 and FIG. 4) with the pivot 21 as an axis and a fulcrum. The reciprocal tread motion exerts a force to the drive member 37 as the force's application point. The drive members 37 drive the cranks 36 to generate torsion and directly rotate the first turning shaft 31. Because the first gear 34 is disposed on the first turning shaft 31 and the first gear 34 engages with the second gear 35, the first turning shaft 31 also drives the first gear 34 and the second gear 35 to rotate when the first turning shaft 31 is turned. Because the second turning shaft 32 is provided with the second gear 35, the second turning shaft 31 is driven to rotate when the second gear 35 is turned. Because the second turning shaft 32 is provided with the one-way sprocket wheel 41, the one-way sprocket wheel 41 is driven to rotate when the second turning shaft 31 is turned. Under the transmission of the one-way sprocket wheel 41 and the chain 43, the third gear 42 is driven to turn along with the rear wheel 13, enabling the rear wheel 13 to drive the direct-drive double wing scooter to go forward continuously. Thanks to the action of a speed change of the first gear 34 and the second gear 35, the speed of the direct-drive double wing scooter can be increased greatly.

Furthermore, as shown in FIG. 1 and FIG. 3, the direct-drive double wing scooter of the present invention is further provided with a brake device 51 at a peripheral portion of the frame 10 relative to the rear wheel 13. The handle unit 11 is provided with a brake lever 52 connected with the brake device 51 through a guide wire unit 53. Under the action of the brake device 51 and the brake lever 52, the present invention enhances the riding safety.

Besides, another end of each crank 36, opposite the third turning shaft 33, is provided with a loop clamp 361 for connection of the first turning shaft 31. The loop clamp 361 is provided with a screw 362 for fastening the loop clamp 361 and the first turning shaft 31. The third turning shaft 33 of the drive assembly 30 is sleeved with the drive member 37. The drive member 37 is provided with at least one bearing 38 therein. The bearing 38 is located between the third turning shaft 33 and the drive member 37, enabling the drive assembly 30 to get a smooth running.

When the direct-drive double wing scooter is in a stationary and non-riding state, the pivot 21 serve as the fulcrum and the drive member 37 serves as the force's application point. The force source of the force's application point is the gravity generated by the swing wing 22 (the right swing wing 223 or the left swing wing 224). The drive member 37 drives the crank 36 to generate torsion and directly drives the first turning shaft 31 to rotate so that the center of the aforementioned torsion is located at the first turning shaft 31. Therefore, the aforementioned torsion multiplied by the distance between the first turning shaft 31 and the pivot 21 is the minimum torque of the direct-drive double wing scooter. When in a riding state, a tread force is applied to the step section 222 at the rear end of the right swing wing 223 and the left swing wing 224 to generate a tread torque with the pivot 21 as the fulcrum. The applied tread force multiplied by the distance between the rear end of the right swing wing 223 or the left swing wing 224 and the pivot 21 is the tread torque. When the tread torque is greater than the minimum torque, the direct-drive double wing scooter is advanced.

The features of the present invention are further described hereinafter. Referring to FIG. 5, the distance between the first turning shaft 31 and the pivot 21 is defined as a first distance D1, so that the minimum torque is the torsion multiplied by the first distance D1. The distance between the rear end of the swing wing (for example, the distal end of the rear end of the right swing wing 223) and the pivot 21 is defined as a second distance D2. The tread torque is the tread force multiplied by the second distance D2. The first distance D1 is in the range of 0.10-0.65 times the length of the second distance D2 and contains the end value. When the first distance D1 is less than 0.10 times the length of the second distance D2, the included angle between the swing wing (e.g., the right swing wing 223) and the ground is too large in the riding state. That is, the slope of the right swing wing 223 is too large, so that the rider's foot may fall easily to result in an injury. When the first distance D1 is greater than 0.65 times the length of the second distance D2, the included angle between the swing wing (e.g., the right swing wing 223) and the ground is too small in the riding state, which cannot achieve the exercise effect for the rider to tread the scooter. In addition, the limitations of the numerical ranges described in the present invention and the claims generally include end values. The vertical distance between the pivot 21 and the ground is less than or equal to or greater than the vertical distance between the first turning shaft 31 and the ground. Preferably, the vertical distance between the pivot 21 and the ground is greater than or equal to the vertical distance between the first turning shaft 31 and the ground. The rear end of each swing wing (such as, the rear end of the right swing wing 223) is formed with the step section which inclines upward at a predetermined angle so as to prevent the swing wing from touching the ground when the swing wings are treaded by turns in a riding state.

Figure 6A:
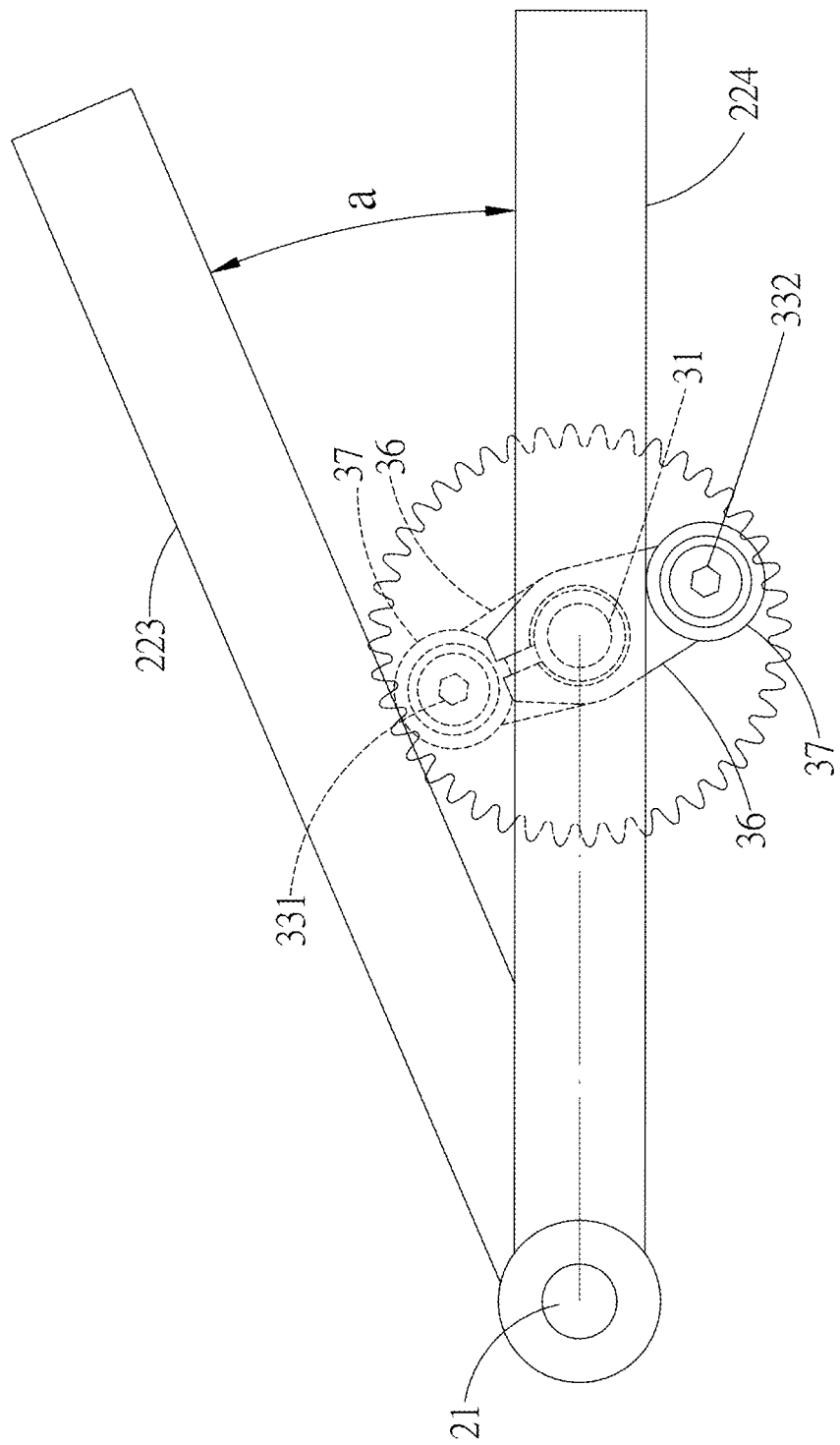
FIG. 6A is a schematic view showing the upper dead point and the upper dead point included angle of the direct-drive double wing scooter in accordance with the preferred embodiment of the present invention.
Figure 6B:
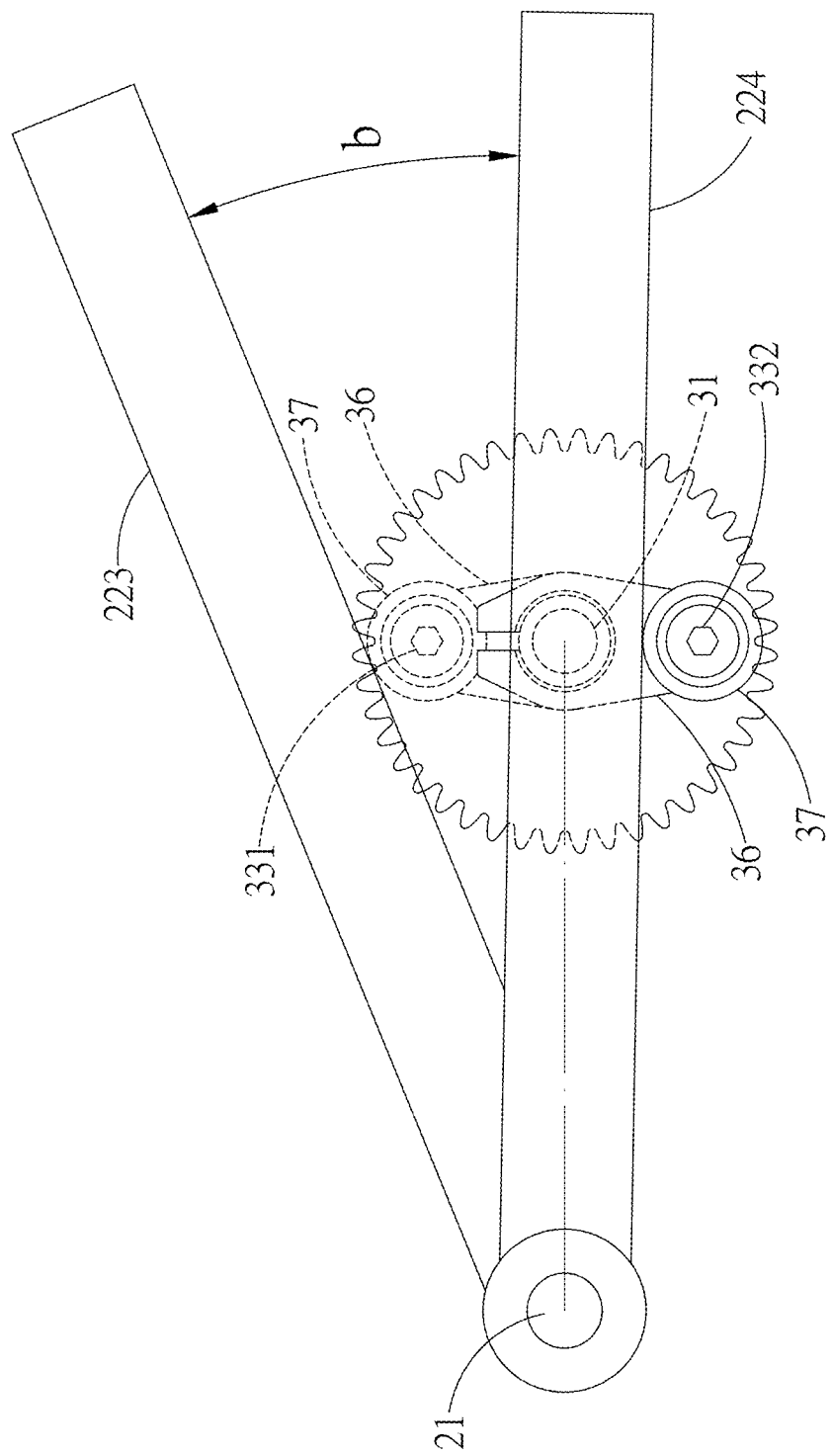
FIG. 6B is a schematic view showing the lower dead point and the lower dead point included angle of the direct-drive double wing scooter in accordance with the preferred embodiment of the present invention.

Referring to FIG. 6A and FIG. 6B, for example, the vertical distance between the pivot 21 and the ground is equal to the vertical distance between the first turning shaft 31 and the ground, and the first distance D1 is 0.28 times the length of the second distance D2. As described above, the two ends of the first turning shaft 31, penetrating through the frame, are provided with the pair of cranks 36 having an included angle of 180 degrees. The tail ends of the cranks 36 are pivotally connected with the third turning shafts 33 to lean against the two swing wings 22 and the drive members 37 fitted on the third turning shafts 33, respectively. The third turning shaft 33 in contact with the right swing wing 223 is defined as a right third turning shaft 331. The other third turning shaft 33 in contact with the left swing wing 224 is defined as a left third turning shaft 332. The connecting line between the right third turning shaft 331 and the first turning shaft 31 and the connecting line of the left third turning shafts 332 and the first turning shaft 31 form an inclined angle of 180 degrees. The right swing wing 223 and the left swing wing 224 are pivotally connected to the front end of the frame 10 through the pivot 21.

Referring to FIG. 6A, in the normal use, when the right swing wing 223 reaches the swing stroke that the connecting line between the right third turning shaft 331 and the first turning shaft 31 is perpendicular to the right swing wing 223, the force exerted to the right swing wing 223 in contact with the drive member 37 and the right third turning shaft 331 cannot generate the torsion. This phenomenon is referred to as an upper dead point. However, at this time, the left swing wing 224 does not reach the lowest point of the swing stroke of the left swing wing 224, and the force exerted to the left swing wing 224 produces the torsion and directly drives the first turning shaft 31 to turn, enabling the right swing wing 223 to disengage from the upper dead point. As described above, when the connecting line between the right third turning shaft 331 and the first turning shaft 31 is perpendicular to the right swing wing 223, the right swing wing 223 and the left swing wing 224 form an upper dead point include angle a. In this embodiment, the upper dead point included angle a is 22.99 degrees.

Referring to FIG. 6B, when the left swing wing 224 reaches the swing stroke that the connecting line between the left third turning shaft 332 and the first turning shaft 31 is perpendicular to the left swing wing 224, the force exerted to the left swing wing 224 in contact with the drive member 37 and the left third turning shaft 332 cannot generate the torsion. This phenomenon is referred to as a lower dead point. Thus, at this time, the force exerted to the right swing wing 223 produces the torsion and directly drives the first turning shaft 31 to turn, enabling the left swing wing 224 to disengage from the lower dead point. As described above, when the connecting line between the left third turning shaft 332 and the first turning shaft 31 is perpendicular to the left swing wing 224, the right swing wing 223 and the left swing wing 224 form a lower dead point included angle b. In this embodiment, the lower dead point included angle b is 23.97 degrees. The difference between the lower dead point included angle b and the upper dead point included angle a is 0.98 degrees, or the ratio of the upper dead point included angle a to the lower dead point included angle b is 0.96. The ratio of the upper dead point included angle a to the lower dead point included angle b is a value obtained by dividing the value of the upper dead point included angle a by the value of the lower dead point included angle b.

In the aforesaid embodiment of FIG. 6A and FIG. 6B, the first distance D1 is 0.28 times the length of the second distance D2. The difference between the lower dead point included angle b and the upper dead point included angle a is 0.98 degrees. The ratio of the upper dead point included angle a to the lower dead point included angle b is 0.96. This is the preferred embodiment.

In an embodiment, when the first distance D1 is 0.18 times the length of the second distance D2, the upper dead point included angle a is 36.20 degrees, the lower dead point included angle b is 40.00 degrees, the difference between the lower dead point included angle b and the upper dead point included angle a is 3.80 degrees, and the ratio of the upper dead point included angle a to the lower dead point included angle b is 0.90. In an embodiment, when the first distance D1 is 0.47 times the length of the second distance D2, the upper dead point included angle a is 14.35 degrees, the lower dead point included angle b is 14.60 degrees, the difference between the lower dead point included angle b and the upper dead point included angle a is 0.25 degrees, and the ratio of the upper dead point included angle a to the lower dead point included angle b is 0.98. In an embodiment, when the first distance D1 is 0.65 times the length of the second distance D2, the upper dead point included angle a is 10.46 degrees, the lower dead point included angle b is 10.51 degrees, the difference between the lower dead point included angle b and the upper dead point included angle a is 0.05 degrees, and the ratio of the upper dead point included angle a to the lower dead point included angle b is 1.00.

In the present invention, the first distance D1 is in the range of 0.10-0.65 times the length of the second distance D2. The difference between the lower dead point included angle b and the upper dead point included angle a is in the range of 0.05-3.80 degrees or the ratio of the upper dead point included angle a to the lower dead point included angle b is in the range of 0.85-1.00. Preferably, according to all the aforesaid embodiments, the first distance D1 is in the range of 0.18-0.65 times the length of the second distance D2. The difference between the lower dead point included angle b and the upper dead point included angle a is in the range of 3.80-0.05 degrees, or the ratio of the upper dead point included angle a to the lower dead point included angle b is in the range of 0.90-1.00. Alternatively, the first distance D1 is in the range of 0.10-0.65 times the length of the second distance D2. The difference between the lower dead point included angle b and the upper dead point included angle a is in the range of 0.05-3.80 degrees and the ratio of the upper dead point included angle a to the lower dead point included angle b is in the range of 0.85-1.00.

According to all the aforesaid embodiments, the upper dead point included angle a is in the range of 10.46-36.20 degrees. The lower dead point included angle b is in the range of 10.51-40.00 degrees. The lower dead point included angle b is greater than the upper dead point included angle a.

Because the difference between the lower dead point included angle b and the upper dead point included angle a is greater than zero and the lower dead point included angle b is greater than the upper dead point included angle a, the right swing wing 223 can be disengaged from the upper dead point by the exerted force of the left swing wing 224 and the left swing wing 224 can be disengaged from the lower dead point by the exerted force of the right swing wing 223, such that the right swing wing 223 and the left swing wing 224 can be treaded repeatedly without being jammed at the upper dead point and the lower dead point. The greater the difference, the easier to disengage the right swing wing 223 from the upper dead point through the exerted force of the left swing wing 224 and the easier to disengage the left swing wing 224 from the lower dead point through the exerted force of the right swing wing 223. The direct-drive double wing scooter of the present invention provides a simple and reliable drive way and provides a drive mode different from that of a traditional bike and has transportation, amusement and fitness effect. Particularly, the riding safety is improved because the movement area for the rider's both feet is located at the outside of the drive assembly. Through the step section which is inclined upward at a predetermined angle and disposed at the rear end of each swing wing, the riding comfort is enhanced.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A direct-drive double wing scooter, comprising a frame, an actuation assembly, a drive assembly, and a transmission assembly; a front end of the frame being provided with a handle unit and a front wheel disposed under the handle unit and controlled by the handle unit, a rear end of the frame being provided with a rear wheel; the actuation assembly comprising two swing wings each pivoted to the front end of the frame through a pivot; the two swing wings being a right swing wing located at a right side of the frame and a left swing wing located at a left side of the frame; the drive assembly comprising a first turning shaft and a second turning shaft, the first turning shaft and the second turning shaft penetrating through the left and right sides of the frame, one end of the first turning shaft being provided with a first gear, one end of the second turning shaft being provided with a second gear meshing with the first gear, the first gear and the second gear being located at the same side of the frame, two ends of the first turning shaft being provided with a pair of cranks having an included angle of 180 degrees, a tail end of each crank being pivotally connected with a third turning shaft to lean against a corresponding one of the right swing wing and the left swing wing; the transmission assembly comprising a one-way sprocket wheel located at another end of the second turning shaft opposite the second gear, a third gear disposed at a wheel axle of the rear wheel, and a chain fitted around the one-way sprocket wheel and the third gear; a distance between the first turning shaft and the pivot being defined as a first distance, a distance between a rear end of the right swing wing and the pivot being defined as a second distance or a distance between a rear end of the left swing wing and the pivot being defined as a second distance, the first distance being in the range of 0.10-0.65 times the length of the second distance; the two third turning shafts of the pair of cranks being a right third turning shaft in contact with the right swing wing and a left third turning shaft in contact with the left swing wing; wherein when a connecting line between the right third turning shaft and the first turning shaft is perpendicular to the right swing wing, the right swing wing and the left swing wing form an upper dead point included angle; when a connecting line between the left third turning shaft and the first turning shaft is perpendicular to the left swing wing, the right swing wing and the left swing wing form a lower dead point included angle; the lower dead point included angle is greater than the upper dead point included angle; wherein a difference between the lower dead point included angle and the upper dead point included angle is in the range of 0.05-3.80 degrees, or a ratio of the upper dead point included angle to the lower dead point included angle is in the range of 0.85-1.00.

2. The direct-drive double wing scooter as claimed in claim 1, wherein the first distance is in the range of 0.18-0.65 times the length of the second distance.

3. The direct-drive double wing scooter as claimed in claim 2, wherein the ratio of the upper dead point included angle to the lower dead point included angle is in the range of 0.90-1.00.

4. The direct-drive double wing scooter as claimed in claim 3, wherein the upper dead point included angle is in the range of 10.46-36.20 degrees.

5. The direct-drive double wing scooter as claimed in claim 3, wherein the lower dead point included angle is in the range of 10.51-40.00 degrees.

6. The direct-drive double wing scooter as claimed in claim 4, wherein the lower dead point included angle is in the range of 10.51-40.00 degrees.

7. The direct-drive double wing scooter as claimed in claim 1, wherein a vertical distance between the pivot and the ground is greater than or equal to a vertical distance between the first turning shaft and the ground.

8. The direct-drive double wing scooter as claimed in claim 1, wherein a vertical distance between the pivot and the ground is equal to a vertical distance between the first turning shaft and the ground.

9. The direct-drive double wing scooter as claimed in claim 1, wherein the difference between the lower dead point included angle and the upper dead point included angle is in the range of 0.05-3.80 degrees, and the ratio of the upper dead point included angle to the lower dead point included angle is in the range of 0.85-1.00.

10. The direct-drive double wing scooter as claimed in claim 9, wherein the first distance is in the range of 0.18-0.65 times the length of the second distance.

11. The direct-drive double wing scooter as claimed in claim 10, wherein the ratio of the upper dead point included angle to the lower dead point included angle is in the range of 0.90-1.00.

12. The direct-drive double wing scooter as claimed in claim 11, wherein the upper dead point included angle is in the range of 10.46-36.20 degrees.

13. The direct-drive double wing scooter as claimed in claim 11, wherein the lower dead point included angle is in the range of 10.51-40.00 degrees.

14. The direct-drive double wing scooter as claimed in claim 12, wherein the lower dead point included angle is in the range of 10.51-40.00 degrees.

15. The direct-drive double wing scooter as claimed in claim 9, wherein a vertical distance between the pivot and the ground is greater than or equal to a vertical distance between the first turning shaft and the ground.

16. The direct-drive double wing scooter as claimed in claim 9, wherein a vertical distance between the pivot and the ground is equal to a vertical distance between the first turning shaft and the ground.

* * * * *